E. C. LOTH.
COMBINED RIVETING AND PUNCHING MACHINE.
APPLICATION FILED JUNE 11, 1917.
1,288,627.
Patented Dec. 24, 1918.
3 SHEETS—SHEET 1.
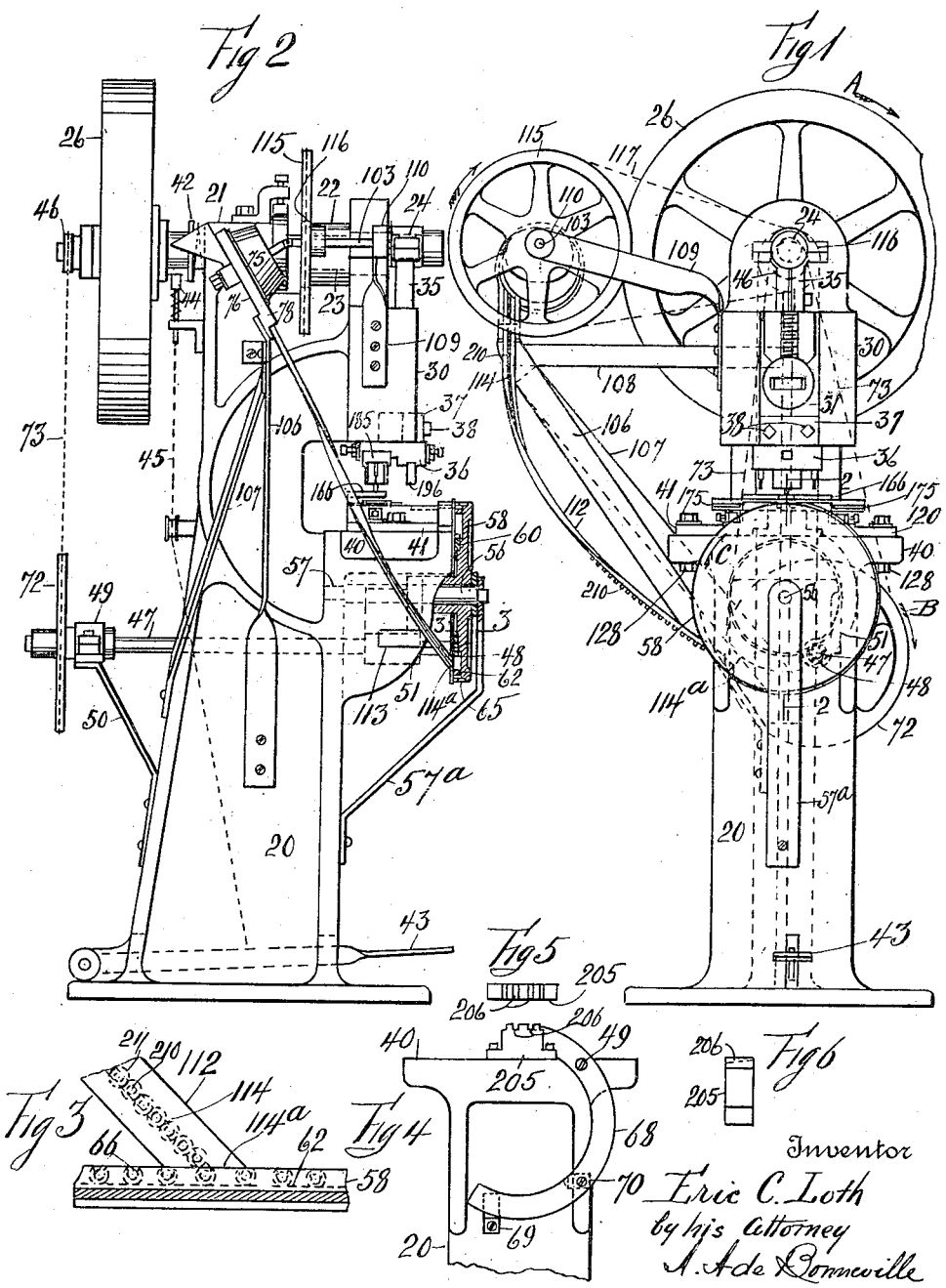

E. C. LOTH.
COMBINED RIVETING AND PUNCHING MACHINE.
APPLICATION FILED JUNE 11, 1917.
1,288,627.
Patented Dec. 24, 1918.
3 SHEETS—SHEET 2.
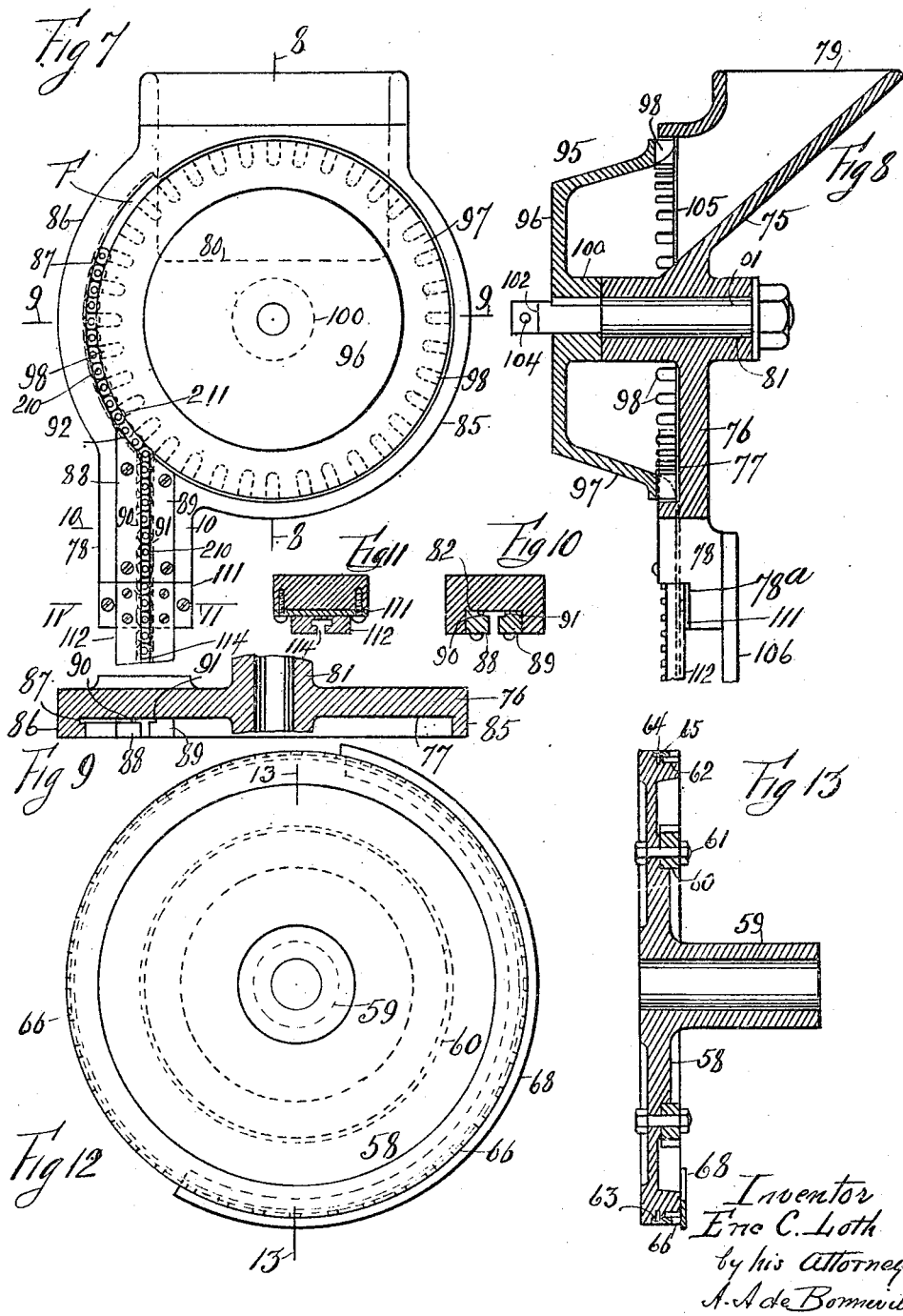

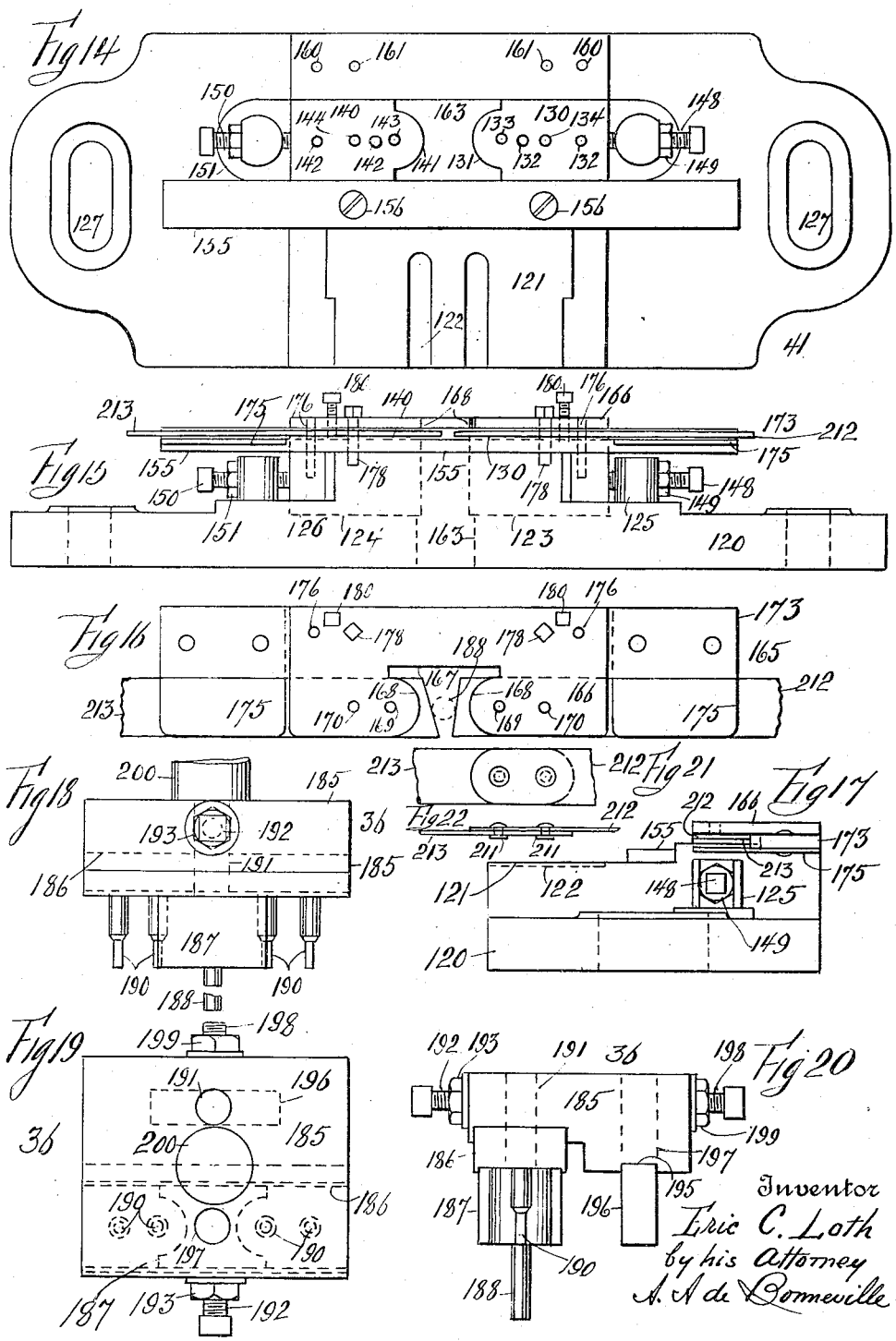

UNITED STATES PATENT OFFICE.

ERIC C. LOTH, OF ELIZABETH, NEW JERSEY, ASSIGNOR TO MENTE & CO., OF NEW YORK, N. Y., A COPARTNERSHIP CONSISTING OF EMANUEL V. BENJAMIN AND EUGENE W. MENTE.

COMBINED RIVETING AND PUNCHING MACHINE.

1,288,627. Specification of Letters Patent. Patented Dec. 24, 1918.

Application filed June 11, 1917. Serial No. 173,969.

*To all whom it may concern:*

Be it known that I, ERIC C. LOTH, citizen of the United States, and resident of Elizabeth, in the county of Union and State of New Jersey, have invented certain new and useful Improvements in Combined Riveting and Punching Machines, of which the following is a specification.

This invention relates to a combined riveting and punching machine. Its object is the production of a machine which will punch holes through and shape the ends of a pair of strips of bands or ties to prepare them to be fastened by automatically fed rivets, and forming at the riveted ends of the strips what is commercially known as a double riveted no spider tie.

By means of this tie second hand strips of ties or bands can be riveted together producing ties or bands that do not contain any pointed projections that may cause injury when handled. The riveted strips produce ties or bands that can be fastened in place over bales of cotton or other material, and thereby the strips which would otherwise be too short for bales can be used to take the place of new ties or bands of the proper length.

In the accompanying drawings Figure 1 shows a front view of an exemplification of the machine; Fig. 2 represents a left hand side view of Fig. 1 with a partial section on the line 2, 2 of Fig. 1; Fig. 3 shows an enlarged partial section of Fig. 2 on the line 3, 3; Fig. 4 shows a partial front view of the frame of the machine with some details; Fig. 5 shows a top plan view of a detail of Fig. 4; Fig. 6 represents an enlarged right hand side view of said detail; Fig. 7 represents an enlarged front view of the agitator of the machine with its feeding hopper; Fig. 8 shows a section of Fig. 7 on the line 8, 8; Fig. 9 shows a section of Fig. 7 on the line 9, 9; Fig. 10 represents a section of Fig. 7 on the line 10, 10; Fig. 11 is a section of Fig. 7 on the line 11, 11; Fig. 12 shows an enlarged front elevation of a distributing disk and another element of the machine; Fig. 13 represents a section of Fig. 12 on the line 13, 13; Fig. 14 represents an enlarged plan view of a shoe with a pair of female dies; Fig. 15 shows a front elevation of Fig. 14 with a stripper therefor in place; Fig. 16 represents a top plan view of the stripper; Fig. 17 represents a left hand side view of Fig. 14; Fig. 18 represents a front elevation of a shoe with a male die and punches; Fig. 19 is a top plan view of Fig. 18; Fig. 20 represents a left hand view of Fig. 18; Fig. 21 shows a plan view of a pair of strips after being sheared and riveted and Fig. 22 is a front view of Fig. 21.

The machine is shown to comprise in part a punch having a frame designated in its entirety by the numeral 20. The frame has formed therewith at its upper portion journal bearings 21, 22 for a shaft 23. A pin 24 of the shaft 23 has its longitudinal axis eccentric with the longitudinal axis of the shaft. A flywheel and pulley 26 is fastened to the shaft 23. The head 30 of the frame 20 has guided therein the cross-head 31. A connecting rod indicated in its entirety by the numeral 35 connects the pin 24 and the cross-head 31. A shank 36 is connected to the cross-head 31 by means of the block 37 and the screws 38. A table 40 is formed with the frame 20 and supports a shoe 41 with its appurtenances, as will be described in detail. A clutch for the flywheel is shown in its entirety by the numeral 42. A treadle 43 is hinged to the lower portion of the frame 20. A starting plug 44, of the clutch 42 has connected thereto one end of the chain 45, while the other end of the chain is connected to the treadle 43. On the shaft 23 is fastened a twenty teeth sprocket chain wheel 46. A supplemental shaft is indicated at 47 with the pinion 48 formed at one end thereof.

One end of the latter shaft is journaled in a journal bracket 49 which is supported on a bracket 50. A journal bracket 51 fastened in the frame 20 supports the other end of the supplemental shaft 47.

A journal pin 56 has formed therewith the threaded portion 57 which latter is in threaded engagement with the frame 20. A bracket 57ª has its lower end fastened to the frame 20 and its upper end has a bearing which supports the outer end of the pin 56. A distributing disk 58 with the bearing 59 is journaled on the shaft 56. An annular spur gear 60 is bolted to the disk 58 by means of the bolts 61. The spur gear 60 meshes with the pinion 48. In the periphery of the disk 58 are formed the grooves 62 and 63. In the groove 63 is secured by means of screws 64 a band 65 having in this instance forty slots 66. A rivet retainer ring 68 is fastened to the table 40, by means of the screw 49 and is also supported on the brackets 69 and 70, which in turn are fastened to the frame 20. A sprocket chain wheel 72, in this instance with one hundred teeth, is fastened to the shaft 47 and a sprocket chain 73 connects the wheels 72 and 46.

A receiving hopper is indicated in its entirety by the numeral 75. The hopper has formed therewith the disk 76 with the inner face 77 from which extends the leg 78, with the notched portion 78$^a$. The inlet opening for the hopper is shown at 79 and the outlet opening thereof is shown at 80. A journal bearing 81 is formed with the disk 76. In the leg 78 is formed a groove 82. A flange comprising the portions 85 and 86 is formed with the said disk 76. The flanges are concentric with the axis of the bearing 81 and the flange 85 is struck with a radius that is smaller than the radius of the flange 86. A circular groove 87 is formed with the flange 86. In the groove 82 of the leg 78 are secured a pair of guide bars 88, 89 which respectively have formed on the inner faces thereof the guide grooves 90 and 91. At the upper end of the guide bar 88 is formed the circular guide groove 92. The said guide grooves are all in the same plane and the grooves 87, 90 and 92 form one continuous channel of grooves. An agitator is indicated in its entirety by the numeral 95, and comprises the outer wall 96, the tapering side wall 97, with openings 98, in this instance thirty-six in number. With the wall 96 is formed the boss 100. A shaft 101 is fastened to the agitator 95 and is journaled in the bearing 81. One end of the shaft 101 has a slot 102 for the male end of the shaft 103 that is connected to the shaft 101 by means of a pin 104. The lower end of the side wall 97 of the agitator is located within the flanges 85 and 86 of the hopper 75, and a clearance space 105 is maintained between the lower edge of the agitator 95 and the accompanying face 77 of the disk 76 of the hopper 75. A supporting brace 106 has one end fastened to and supports the leg 78 of the hopper 75 and the other end of said brace is fastened to and supported on the frame 20. Braces 107 and 108 connect the brace 106 with said frame 20. A brace 109 has one end fastened to the head 30, of the punch, and at its upper end is formed a journal bearing 110 which supports one end of the shaft 103. A plate 111 is fastened to the notched portion 78$^a$, and the upper end of a rivet chute 112 is supported on said plate, while the lower end of said chute is supported on a bracket 113, which extends from the frame 20. The said chute has formed therein the T shaped channel 114 and is twisted so that the said channel at its lower end is in a plane 180° from the plane of its upper end. The lower edge 114$^a$ of the chute bears against the rim of the distributing disk 58 so that the channel 114 registers with the groove 62 and slots 66.

A sprocket chain wheel 115, in this instance with one hundred teeth, is fastened to the shaft 103 and a sprocket chain wheel 116, in this instance with forty teeth, is fastened to the shaft 23. A sprocket chain 117 connects the sprocket chain wheels 115 and 116.

The shoe 41 has formed therewith the supporting plate 120, the upper table 121, with the guide groove 122 and the lower die supporting tables 123, 124. Posts 125, 126, extend up from the plate 120.

The supporting plate 120 has formed therein openings 127 through which bolts 128 extend to fasten the shoe to the table 40. A female die 130 having the curved cutting edge 131 is fastened to the table 123 by means of the screws 132. Openings 133, 134 extend vertically through the die 130, as well as through the table 123 and through the table 41 of the punch. A female die 140 having the curved cutting edge 141, is fastened to the table 124 by means of the screws 142. Openings 143, 144 extend vertically through the die 140 as well as through the table 124 and the table 40 of the punch. A screw 148 is in threaded engagement with the post 125 and bears against the outer face of the die 130. A jam nut 149 on the screw 148 bears against the post 125. A screw 150 is in threaded engagement with the post 126 and bears against the outer face of the die 140. A jam nut 151, on the screw 150, bears against the post 126. A bar 155 is fastened to the table 121 by means of the screws 156. The bar 155 bears against the dies 130 and 140 to maintain them in proper position.

In the rear portion of the supporting table 121 there are formed openings 160 for dowel pins to be described, and threaded openings 161 are formed in said table. Between the dies 130 and 140 and between the tables 133 and 124 is formed a clearance space designated in its entirety by the numeral 163.

A stripper is designated in its entirety by the numeral 165, and comprises the top plate 166 having an opening 167 with the curved edges 168 similar to curved edges 131 and 141 of the dies 130 and 140. Openings 169 170 are formed in the plate 166. A plate 173 is located below the plate 166 and fastened thereto by rivets, not shown, or otherwise. To the lower face of the ends of the plate 173 are riveted the plate 175. Dowel pins 176 extend from the stripper to engage the openings 160 in the supporting table 120 of the shoe 41. Screws 178 extend through openings in the stripper to engage the threaded openings 161 of the table 121. Screws 180 extend through the stripper and bear upon the table 121.

The shank 36 comprises the body portion 185 in which is formed a channel for the block 186 which in turn supports the male die 187 that coacts with the dies 130 and 140. A stop pin 188 extends from the die 187. Punches 190 extend from the block 186 and which are of a size and are located to enter the openings 169, 170 of the stripper 165 and the openings 133, 134 of the die 130. A pin 191 extends from the die 187 and a screw 192 threaded in the body portion 185 engages said pin. A jam nut 193 on the screw 192 locks the latter in place. A channel 195 is formed in the body portion 185 for the riveting hammer 196 which latter has extending therefrom the shank 197 that enters an opening in said body portion 185. A clamping screw 198 is in threaded engagement with the said body portion and engages the shank 197. A jam nut 199 is provided for the screw 198. A pin 200 extends from the body portion 185.

A rivet receiving block 205 is fastened to the table 40 and has formed in its upper face a pair of rivet guides 206. The guides 206 register with the guide slots 122 of the upper table 121.

To operate the machine the flywheel and pulley 26 is turned by means of a belt not shown in the direction of the arrow A and every time the operator trips the treadle 43 the shaft 23 makes one revolution. The revolutions of the shaft 23 by means of the chain 73, causes the sprocket chain wheel 72 to turn in the direction of the arrow B. Thereby the pinion 48 turns the distributing disk 58 in the direction of the arrow C. At the same time the hopper 75 is fed with the rivets having the shanks 210 and heads 211. The ends of a pair of strips 212, 213 to be riveted together are fed into the stripper 165 and located upon the dies 130 and 140, their accompanying ends abutting against the stop pin 188, and when the treadle 43 is tripped the male die 187 coacting with the female dies 130 and 140 shears off the ends of the strips 212, 213 to conform with the curved cutting edges of said dies, and the punches 190 punch a pair of openings in each of the strips. During the revolutions of the shaft 23 of the machine the rivets enter the agitator 95 from the hopper 75, and are discharged from said agitator through the openings 98, into the channels F and 87 between the flange 86 and the adjoining portion of the side wall 97 of the agitator 95. The openings 98 of the agitator are just a little wider than the diameters of the shanks 210 of the rivets and the clearance space 105 is a little wider than the thickness of the head 211 of the rivets. By this means the rivets are located with their heads 211 in the channel 87 and their shanks in channel F. The rivets are fed by gravity into the T-shaped channel 114 of the rivet chute 112. During the rotations of the distributing disk 58, the rivets are fed into the same, the heads 211 of the rivets being seated into the groove 62 and the shanks 210 are located into the slots 66.

The distributing disk 58 carries the rivets one after the other opposite the rivet guides 206 of the rivet receiving block 205, the rivet retaining ring 68 keeping the rivets in the slots of the said disk as they are carried upwardly.

After the ends of the strips 212, 213 have been cut to the proper shape and their holes have been punched therein, the operator brings one of the strips like 212 over a pair of the rivets that are opposite the rivet guides 206 and engages the openings in said strip with said pair of rivets. He then draws the rivets out of the slots 62 and 66 and moves the band, with its rivets under the riveting hammer 196. The rivet heads 211 at the time of said movement being guided in the guides 206 of the rivet receiving block 205. When the strip 212 is in proper position under the riveting hammer 196, the strip 213 is placed thereon with its openings engaging the shanks 210 of the rivets. The treadle 43 is now tripped and the hammer 196 upsets the shanks 210 of the rivets and securely rivets the ends of the strips 212, 213. Upon the up stroke of the hammer 196 the riveted band is removed and the machine is ready for a second operation.

Having described my invention, what I desire to secure by Letters Patent and claim is:

1. In a machine the combination of means to shear the ends of a pair of strips and simultaneously punch holes therein, means to automatically feed rivets in proper position for the holes in said bands and means to upset said rivets and thereby rivet said strips together.

2. In a machine the combination of a receiving hopper for rivets, a rotating agitator to receive said rivets from the hopper and having openings in the side wall thereof to discharge said rivets, a rivet chute with one end coacting with the openings in said agitator and a distributing disk having a groove and slots in the periphery thereof, the said groove and slots coacting with said chute.

3. In a machine the combination of a receiving hopper for rivets and having a disk with a pair of flanges formed therewith, a rotating agitator having openings in the said wall thereof journaled over a face of the disk of the hopper and having a clearance space between the bottom face of the agitator and said face of the disk, a pair of concentric channels between said agitator and one of said flanges, and a rivet chute coacting with said channels.

4. In a machine the combination of a rivet chute, a rotating distributing disk coacting with one end of said chute, the said disk having a groove in the periphery thereof and a band having slots over said groove.

5. In a machine the combination of a distributing disk with slots in the periphery thereof and a rivet chute with its lower end bearing against said disk so that its channel will intermittently register with the said slots to feed rivets by gravity from said chute to said disk.

6. In a machine the combination of a rivet distributing disk with slots in the periphery thereof, a rivet chute with one end bearing against said disk to automatically feed rivets from the chute to the disk and a rivet receiving block at the upper portion of the disk and intermittently registering with a pair of said slots.

7. In a machine the combination of a rivet distributing disk with slots in the periphery thereof, a stationary rivet retaining ring covering a number of the slots of said disk, and a rivet chute with one end thereof bearing against said disk and at the lower portion of said ring to automatically feed rivets to said slots.

8. In a machine the combination of a frame having a table, a shaft journaled in the frame, punches over the table, means between the shaft and punches to reciprocate the latter, means to locate in operative position a pair of strips under said punches, means to shear the ends of said strips and means to automatically feed rivets in proper position for said strips.

9. In a machine the combination of a frame having a table and a head, a shaft journaled in the frame, a fly wheel and pulley journaled on the shaft, a clutch to connect the fly-wheel and pulley to the shaft, a treadle with one end hinged to the frame, a connection between the treadle and clutch, a reciprocating cross head in the head of the frame, a male die and punches reciprocating with the cross-head, a shoe carried on the table of the frame, a pair of female dies for said shoe coacting with said male die, a stripper for said shoe located so that a pair of strips can be located at the opposite ends thereof over the shoe, a stop pin extending from the male die and reciprocating in an opening in said stripper to enable the accompanying ends of the strips to abut against and a hammer reciprocating with said cross head.

Signed at the borough of Manhattan, in the county of New York and State of New York, this 26th day of May, A. D. 1917.

ERIC C. LOTH.

Witnesses:
A. A. DE BONNEVILLE,
A. W. BAKER.

Copies of this patent may be obtained for five cents each, by addressing the "Commissioner of Patents, Washington, D. C."